(12) United States Patent
Zuo et al.

(10) Patent No.: US 10,967,331 B2
(45) Date of Patent: Apr. 6, 2021

(54) HOLLOW FIBER MEMBRANE

(71) Applicant: National University of Singapore, Singapore (SG)

(72) Inventors: Jian Zuo, Singapore (SG); Tai-Shung Neal Chung, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 16/340,670

(22) PCT Filed: Oct. 26, 2017

(86) PCT No.: PCT/SG2017/050538
§ 371 (c)(1),
(2) Date: Apr. 9, 2019

(87) PCT Pub. No.: WO2018/080398
PCT Pub. Date: May 3, 2018

(65) Prior Publication Data
US 2019/0247802 A1    Aug. 15, 2019

(30) Foreign Application Priority Data

Oct. 26, 2016  (SG) .............. 10201608965S (51) Int. Cl.
*B01D 61/36* (2006.01)
*B01D 69/02* (2006.01)
*B01D 69/08* (2006.01)
*B01D 71/34* (2006.01)
*C02F 1/44* (2006.01)
*C02F 103/08* (2006.01)

(52) U.S. Cl.
CPC ........... *B01D 69/02* (2013.01); *B01D 61/364* (2013.01); *B01D 69/08* (2013.01); *B01D 69/087* (2013.01); *B01D 71/34* (2013.01); *C02F 1/447* (2013.01); *B01D 2325/025* (2013.01); *B01D 2325/026* (2013.01); *B01D 2325/04* (2013.01); *B01D 2325/20* (2013.01); *B01D 2325/24* (2013.01); *B01D 2325/38* (2013.01); *C02F 2103/08* (2013.01)

(58) Field of Classification Search
CPC ... B01D 69/02; B01D 69/087; B01D 2325/24
See application file for complete search history.

(56) References Cited

U.S. PATENT DOCUMENTS

2006/0234582 A1    10/2006    Gohl et al.

FOREIGN PATENT DOCUMENTS

| CN | 103157391 A | 6/2013 |
|---|---|---|
| WO | 2015118045 A1 | 8/2015 |

OTHER PUBLICATIONS

Wang, Dongliang et al—"Porous PVDF asymmetric hollow fiber membranes prepared with the use of small molecular additives"—Journal of Membrane Science 178 (2000) 13-23 (Year: 2000).*
Hou, Deyin et al., "Fabrication and characterization of hydrophobic PVDF hollow fiber membranes for desalination through direct contact membrane distillation", Separation and Purification Technology, Sep. 15, 2009, 78-86.
Zuo, J. et al., "PVDF hollow fibers with novel sandwich structure and superior wetting resistance for vacuum membrane distillation", Desalination, vol. 417, May 19, 2017, 94-101.
International Search Report for International Application No. PCT/SG2017/050538 dated Dec. 22, 2017.

* cited by examiner

*Primary Examiner* — Bradley R Spies
(74) *Attorney, Agent, or Firm* — Perkins Coie LLP (57) ABSTRACT

There is provided a hollow fiber membrane for vacuum membrane distillation having a maximum tensile strength of a ≥3.5 MPa and a liquid entry pressure (LEP) of ≥3.0 bar, wherein the hollow fiber membrane is a single layer hollow fiber membrane comprising a wall with a thickness of ≤150 μm and a cross-section comprising two open cell layers with an array of interconnected pores and a macrovoid layer between the two open cell layers. The hollow fiber has improved mechanical strength and vacuum membrane distillation flux.

14 Claims, 4 Drawing Sheets

Inner surface — Cross-section — Enlarged cross-section

Figure 4

Inner surface — Cross-section — Enlarged cross-section

Inner surface     Cross-section     Enlarged cross-section

Figure 7

(A) S5 fibers (B) S6 fibers

Figure 8

Inner surface

Cross-section

Enlarged cross-section

HOLLOW FIBER MEMBRANE

This application is a National Stage of International Application PCT/SG2017/050538, filed Oct. 26, 2017; which claims the priority of Singapore Application No. 10201608965S, filed Oct. 26, 2016. The contents of the above-identified applications are incorporated herein by reference in their entireties.

TECHNICAL FIELD

The present invention relates to a hollow fiber membrane, particularly to a hollow fiber membrane for vacuum membrane distillation.

BACKGROUND

Water scarcity and fresh water shortage are major global issues, especially in the remote and arid regions. The situation is further exacerbated along with rapid population growth, severe water pollution and climate change. Since about 97% of water in the planet is seawater, it has great potential to provide fresh water, for example by desalination.

Multi-stage flash distillation (MSF) and seawater reverse osmosis (SWRO) are the common methods utilised in desalination plants. However, these method consume high energy and rely upon fossil fuels. Therefore, there is a need for improved desalination methods which produce fresh water with lower energy and at a lower cost. An example of such a method is membrane distillation (MD) which has: mild operation conditions; a 100% theoretical rejection to salts; an ability to link with low grade heat sources and renewable energy; and flexibility for small scale and niche applications.

In particular, MD is a thermally powered process based on vapour-liquid equilibrium. The driving force for a MD process is the partial pressure difference between the feed and permeate sides. An example of MD is vacuum membrane distillation (VMD) which has advantages of higher membrane flux and better thermal efficiency. Because of the applied vacuum in VMD, the water vapour is immediately drawn to a permeate side. This not only enhances the vapour transportation, but also effectively reduces the mass transfer boundary layer. Meanwhile, since the membrane pores are vacuumed, the membrane heat transfer coefficient is minimized. All these effects contribute to a higher flux and better thermal efficiency in VMD as compared to other MD methods.

The membrane used in the MD plays an important role in determining the efficiency of the MD process. Microporous polyvinylidene fluoride (PVDF) membranes have been widely adopted for MD applications. Various high performance PVDF hollow fiber membranes have been developed for MD applications which have high MD permeation flux. However, these hollow fiber membranes are not suitable for practical MD applications due to their poor mechanical strength and low liquid entry pressure (LEP) values. The lack of appropriate membranes specially designed for MD process has limited its application in desalination.

There is therefore a need for an improved membrane for a MD process.

SUMMARY OF THE INVENTION

The present invention seeks to address these problems, and/or to provide an improved hollow fiber membrane.

In general terms, the invention relates to a hollow fiber membrane particularly suited for membrane distillation processes, such as, but not limited to vacuum membrane distillation. The hollow fiber membrane of the present invention has good mechanical strength, anti-wetting properties and LEP, and also exhibits desirable membrane distillation flux.

According to a first aspect, the present invention provides a hollow fiber membrane for vacuum membrane distillation, the hollow fiber membrane having a maximum tensile strength of a ≥3.5 MPa and a liquid entry pressure (LEP) of ≥3.0 bar, wherein the hollow fiber membrane is a single layer hollow fiber membrane comprising a wall with a thickness of ≤150 μm and a cross-section comprising two open cell layers with an array of interconnected pores and a macrovoid layer between the two open cell layers.

The hollow fiber membrane may comprise an outer surface on its outer side and an inner surface on its inner side and facing its lumen. The hollow fiber membrane may have a continuous skin on its inner surface and/or on its outer surface, wherein pores may be formed in the skin of the inner surface and/or in the skin of the outer surface.

The hollow fiber membrane may have suitable porosity. For example, the porosity of the hollow fiber membrane may be ≥60%. In particular, the porosity of the hollow fiber membrane may be ≥70%.

The hollow fiber membrane also has a desirable vacuum permeation flux. According to a particular aspect, the hollow fiber membrane may have a vacuum permeation flux ≥8 kg/m$^2$ h at 60° C. seawater feed.

The hollow fiber membrane may have a substantially circular cross-section.

According to a particular aspect, the hollow fiber membrane may be hydrophobic. In particular, the hollow fiber membrane may be prepared from a dope composition comprising a hydrophobic polymer, an additive and a solvent. The dope composition may comprise the hydrophobic polymer, additive and solvent in any suitable ratio. For example, the weight ratio of the hydrophobic polymer to the additive to the solvent may be 12-16%:8-15%:69-80%. In particular, the weight ratio may be 13/10/77.

The hydrophobic polymer comprised in the dope composition may be any suitable polymer. In particular, the polymer may be polyvinylidene fluoride (PVDF).

The additive comprised in the dope composition may be any suitable additive. According to a particular aspect, the additive may be a non-solvent. In particular, the additive may be a pore-forming agent. For example, the additive may be, but is not limited to, lithium chloride, lithium perchlorate, ethylene glycol, polyethylene glycol, propanol, glycerol, water, or a combination thereof. Even more in particular, the additive may be a combination of ethylene glycol and lithium chloride.

The solvent comprised in the dope composition may be any suitable solvent. For example, the solvent may be, but not limited to, N-methyl-2-pyrrolidone (NMP), dimethylacetamide (DMAC), dimethylformamide (DMF), dimethylsulfoxide (DMSO) or a combination thereof. In particular, the solvent may be NMP.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings.

DETAILED DESCRIPTION

As explained above, there is a need for an improved hollow fiber membrane. This is because, membranes used in membrane distillation (MD) processes must have the following requirements: (i) high performance in terms of flux and rejection; (ii) good mechanical strength; and (iii) high anti-wetting properties. Inadequate mechanical stability may instigate membrane deformation or pore collapse during long-term MD operation. Insufficient anti-wetting property and low LEP values may cause membrane wetting during continuous operation. However, there is a trade-off among these three parameters. Conventional PVDF hollow fiber membranes mainly focus on high performance, which is not applicable for use in MD processes. For example, most of the high performance PVDF hollow fiber membranes which have been developed are unsuitable for VMD applications because of relatively low mechanical properties and low values of LEP. Due to the applied vacuum, much higher mechanical stability and wetting resistance are required for membranes used in VMD.

The present invention provides a hollow fiber membrane with a unique cellular structure and confined pore size. The membrane has superior mechanical strength, high anti-wetting properties and good MD performance, simultaneously. In particular, the present invention provides a hollow fiber membrane for use in membrane distillation such as vacuum membrane distillation.

According to a first aspect, there is provided a hollow fiber membrane for vacuum membrane distillation, the hollow fiber membrane having a maximum tensile strength of a 3.5 MPa and a liquid entry pressure (LEP) of ≥3.0 bar, wherein the hollow fiber membrane is a single layer hollow fiber membrane comprising a wall with a thickness of ≤150 µm and a cross-section comprising two open cell layers with an array of interconnected pores and a macrovoid layer between the two open cell layers.

The hollow fiber membrane may have a substantially circular cross-section. However, it would be apparent to a person skilled in the art that the membrane may have other suitable cross-sectional shapes, such as substantially rectangular, square or hexagonal.

The hollow fiber membrane may comprise an outer surface on its outer side and an inner surface on its inner side and facing its lumen. The hollow fiber membrane may have a continuous skin on its inner surface and/or on its outer surface, wherein pores may be formed in the skin of the inner surface and/or in the skin of the outer surface.

Figure 1:
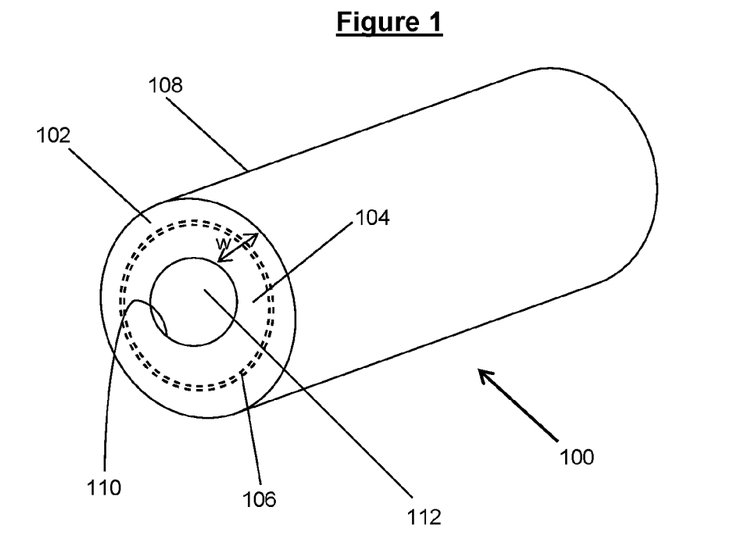
FIG. 1 shows a schematic representation of a hollow fiber membrane according to one embodiment of the present invention.

A schematic representation of the cross-section of the hollow fiber membrane of the present invention is shown in FIG. 1. In particular, FIG. 1 provides a single-layer hollow fiber membrane 100 comprising a generally spherical cross-section. Even more in particular, the hollow fiber membrane 100 comprises a cross-section with a sandwich structure. The sandwich structure comprises a macrovoid layer 106 between two open cell layers 102 and 104. The membrane 100 comprises an outer surface 108 on its outer side and an inner surface 110 on its inner side and facing lumen 112. The outer surface 108 and/or the inner surface 110 may comprise pores formed on a skin on the outer surface 108 or the inner surface 110, respectively.

Each of the open cell layers 102 and 104 may comprise an array of interconnected pores (not shown). In particular, the open cell layers 102 and 104 may be sponge-like porous layers. These layers may enhance the mechanical strength of the hollow fiber membrane 100, while at the same time maintain high membrane porosity and ensure a good VMD flux. The open cell layers 102 and 104 may be derived from spinodal liquid-liquid decomposition during phase inversion during the formation of the membrane 100. A liquid-liquid demixing process causes the formation of cellular structures, while nucleation and growth form interconnected crystalline particles.

According to a particular aspect, the open cell layers 102 and 104 may be of a suitable thickness. For example, the thickness of each of the open cell layers 102 and 104 may be 5-150 µm.

In particular, the thickness of open cell layer 102 may be 15-150 µm, 20-140 µm, 30-130 µm, 40-120 m, 50-110 µm, 60-100 µm, 70-90 µm, 75-80 µm. Even more in particular, the thickness of open cell layer 102 may be 70-110 µm.

In particular, the thickness of open cell layer 104 may be 5-150 µm, 10-140 µm, 20-130 µm, 30-120 µm, 40-110 µm, 50-100 µm, 60-90 µm, 70-80 µm. Even more in particular, the thickness of open cell layer 104 may be 10-20 µm.

The macrovoid layer 106 may be a thin layer compared to the open cell layers 102 and 104. The macrovoid layer 106 may have a suitable thickness. For example, the thickness of the macrovoid layer 106 may be 1-60 µm, In particular, the thickness of the macrovoid layer 106 may be 5-60 µm, 10-55 µm, 15-50 µm, 20-45 µm, 25-40 µm, 30-35 µm. Even more in particular, the thickness of the macrovoid layer 106 may be 40-60 µm.

The macrovoid layer 106 may comprise small-size macrovoids. For example, the macrovoids may have an average pore size of about 10-60 µm. In particular, the average pore size may be about 15-55 µm, 20-50 µm, 25-45 µm, 30-40 µm. Even more in particular the average pore size may be 30-50 µm.

The existence of the macrovoid layer 106 between the two open cell layers 102 and 104 is advantageous for VMD flux because the macrovoid layer 106 perform as highways for water transport. Even more in particular, small-sized macrovoids are preferred in the macrovoid layer 106 as compared to large-sized macrovoids in order to reduce the adverse effect of the large-sized macrovoids on mechanical strength of the membrane 100.

The inner surface 110 of the membrane 100 may be porous. In particular, the inner surface 110 comprises a continuous skin and wherein pores may be formed in the skin of the inner surface 110. Such a porous inner surface is advantageous because when the membrane 100 is in use, the inner surface 110 faces the feed solution during VMD. The porous inner surface 110 will therefore result in improved permeation flux. The porous inner surface 110 also reduces the vapour transport resistance and provides a higher surface area for water evaporation.

The hollow fiber membrane may have suitable porosity. For example, the porosity of the hollow fiber membrane 100 may be ≥60%. In particular, the porosity of the hollow fiber membrane 100 may be ≥70%. A higher porosity of the membrane is preferred for lower mass transfer resistance and thermal conductivity, which are favourable for a higher VMD flux.

For the purposes of the present invention, the maximum tensile strength is defined as the maximum stress that the hollow fiber membrane may withstand while being stretched or pulled before breaking. The hollow fiber membrane according to the present invention may have a maximum tensile strength of a 3.5 MPa. In particular, the tensile strength may be 3.5-5.5 MPa, 3.6-5.2 MPa, 3.7-5.0 MPa, 3.8-4.5 MPa, 4.0-4.2 MPa. Even more in particular, the tensile strength may be about 5.2 MPa.

MD is a thermally driven separation process that employs a hydrophobic membrane as a barrier for the liquid phase, allowing only vapour phase to pass through the membrane pores. Wetting of membrane pores by liquid streams (i.e. the loss of hydrophobic characteristics of membranes) is a crucial issue in MD treatment. Accordingly, the quantitative measurement of membrane wetting resistance is measured by the liquid entry pressure (LEP). In particular, LEP represents the minimum transmembrane pressure for water to permeate through. Accordingly, a higher LEP value indicates a lower risk of membrane wetting during operation. The hollow fiber membrane according to the present invention may have a LEP of: 3.0 bar. In particular, the LEP may be 3.5-6.0 bar, 3.8-5.6 bar, 4.0-5.2 bar, 4.2-5.0 bar, 4.5-4.8 bar. Even more in particular, the LEP may be 4.0 bar.

According to a particular aspect, the hollow fiber membrane may have a wall thickness of ≤150 µm. For the purposes of the present invention, the wall thickness of the membrane is defined as the distance indicated by "w" in FIG. 1. A thin wall thickness is desirable for high transmembrane flow for water vapour. However, too thin a wall thickness may lead to poor mechanical strength of the membrane. In particular, the wall thickness may be 100-150 µm, 105-145 µm, 110-140 µm, 115-130 µm, 120-125 µm. Even more in particular, the wall thickness may be 110 µm.

The hollow fiber membrane also has a desirable vacuum permeation flux. According to a particular aspect, the hollow fiber membrane may have a vacuum permeation flux: 8 kg/m² h at 60° C. seawater feed. In particular, the vacuum permeation flux may be 8-38 kg/m² h, 10-30 kg/m² h, 12-25 kg/m² h, 15-21 kg/m² h, 17-19 kg/m² h. Even more in particular, the vacuum permeation flux may be 37.8 kg/m² h.

According to a particular aspect, the hollow fiber membrane may be hydrophobic. For the purposes of the present invention, hydrophobic may be defined as a non-wettable membrane surface that has substantially zero affinity to water molecules, such that the membrane does not allow passage of water through its surface to the other side of the membrane but may permit the passage of water vapour. In particular, the hydrophobicity of the hollow fiber membrane prevents the mixing of feed fluid flowing through the lumen 112 of the hollow fiber membrane 100 with the permeate that is flowing on the outer surface 108 of the membrane 100, or vice versa.

The hollow fiber membrane may comprise a hydrophobic polymer. In particular, the hydrophobic polymer may be comprised in a dope composition from which the hollow fiber membrane is prepared.

According to a particular aspect, the hollow fiber membrane may be prepared from a dope composition comprising a hydrophobic polymer, an additive and a solvent.

The hydrophobic polymer comprised in the dope composition may be any suitable polymer. In particular, the polymer may be polyvinylidene fluoride (PVDF). PVDF has good chemical and thermal resistance. The PVDF may be of any suitable molecular weight. For example, the molecular weight may be 1000-200000 kDa. In particular, the molecular weight of the PVDF comprised in the dope composition may be 2000-180,000 kDa, 5000-150,000 kDa, 10,000-120,000 kDa, 15,000-100,000 kDa, 20,000-80,000 kDa, 30,000-75,000 kDa, 40,000-60,000 kDa, 45,000-50,000 kDa. Even more in particular, the molecular weight of the PVDF may be 60,000-100,000 kDa.

The additive comprised in the dope composition may be any suitable additive. According to a particular aspect, the additive may be a non-solvent. In particular, the additive may be a pore-forming agent. Even more in particular, the additive may reduce the thermodynamic miscibility of the dope solution. In this way, liquid-liquid demixing may be promoted and the formation of open cell structure may be facilitated. Examples of suitable additive may be, but is not limited to, lithium chloride, lithium perchlorate, ethylene glycol, polyethylene glycol, propanol, glycerol, water, or a combination thereof. In particular, the additive may be a combination of ethylene glycol (EG) and lithium chloride (LiCl).

The solvent comprised in the dope composition may be any suitable solvent. For example, the solvent may be, but not limited to, N-methyl-2-pyrrolidone (NMP), dimethylacetamide (DMAC), dimethylformamide (DMF), dimethylsulfoxide (DMSO), or a combination thereof. In particular, the solvent may be NMP.

The dope composition may comprise the hydrophobic polymer, additive and solvent in any suitable weight ratio based on the total weight of the dope composition. For example, the weight ratio of the hydrophobic polymer to the additive to the solvent may be 12-16%:8-15%:69-80%. In particular, the weight ratio may be 13-15%:10-12%:70-77%. Even more in particular, concentration of the polymer in the dope composition may be about 13 weight %, the concentration of the additive in the dope composition may be about 10 weight % and the concentration of the solvent in the dope composition may be about 77 weight %.

The present invention also provides a method of preparing the hollow fiber membrane described above. The method may comprise:
 preparing a dope composition comprising a polymer, an additive and a solvent; and
 spinning the dope composition to form the hollow fiber membrane.

The dope composition may be as described above and may be formed by any suitable method. For example, the dope composition may be formed by dissolving the polymer in the solvent. According to a particular embodiment, the polymer may be PVDF and the solvent may be NMP. The dope composition may further comprise an additive dissolved in the solvent. For example, the additive may comprise one or more additives. In particular, the additive may comprise LiCl and EG.

The spinning comprises fabrication of the membrane. The spinning may comprise any suitable method. According to a particular aspect, the spinning is carried out by dry-jet wet-spinning process. For example, the dope composition maybe dispensed under pressure through a spinneret at a controlled rate, and passed through an air gap before being immersed into a coagulation bath.

The external coagulant may be any suitable coagulant. For example, the coagulant may be tap water or distilled water. In particular, the external coagulant comprised in the coagulation bath may be tap water.

Any suitable bore fluid may be used for the spinning process. In particular, the bore fluid may comprise a mixture of water and NMP. Even more in particular, the bore fluid may comprise 50 weight % water and 50 weight % NMP.

The hollow fiber membrane that is obtained from the spinning step may be subjected to further post-treatment in a water bath. In one embodiment, the hollow fiber membrane may be submerged into water at room temperature for approximately three days to remove residual solvent and non-solvent compounds. The hollow fiber membrane may thereafter be subjected to a freezing step wherein it is placed in freezer for at least two hours, followed by a freeze drying step which may be undertaken for about twelve hours. The resultant dried membranes may be suitable for membrane characterization and for use in module fabrication.

Since the hollow fiber membrane of the present invention is a single layer hollow fiber membrane, the problem of delamination between layers is avoided. This is a common problem for dual-layer hollow fiber membranes over prolonged use. Further, in use, a dual-layer hollow fiber membrane may encounter additional mass transfer resistance at the interface of the two layers. This would not be the case in the single-layer hollow fiber membrane of the present invention.

The present invention will now be further described by way of the following examples.

Example

In these examples, various hollow fiber membranes were formed, by varying different conditions in the process of preparing the hollow fiber membrane.

Materials

A commercial PVDF polymer, Kynar HSV 900 resin (Arkema Inc.) was used. N-methyl-2-pyrrolidone (NMP) solvent and ethylene glycol (EG) used in hollow fiber spinning was purchased from Merck. Lithium chloride (LiCl) with a purity >99% was procured from Sigma Aldrich. Sodium chloride (NaCl) and analytical grade hexane were acquired from Merck. Deionized water was produced by a Milli-Q unit from MilliPore with the resistivity of 18 MΩ cm.

Spinning of the Hollow Fiber Membrane

The PVDF polymer dope composition was prepared by adding PVDF, EG and LiCl into NMP with a weight ratio of 13/5/5/77. The mixture was mechanically stirred for one day at 65° C. until a homogeneous solution was formed. After complete dissolution, the dope composition was continuously stirred at a low speed to prevent any sedimentation.

The dope composition was degassed overnight before being transferred into an ISCO syringe pump. The pump was kept at 55° C. by an external heater. A dry-jet wet-spinning technique was used to fabricate the hollow fiber membranes. Water was used as the external coagulation bath. To study the effects of coagulation bath temperature, three different temperatures, 25, 40 and 55° C. were used during spinning. A NMP/water (50/50 wt %/wt %) mixture was used as the bore fluid. Two different bore fluid temperatures, 25 and 65° C. were used. Table 1 lists the detailed spinning parameters, including dope flow rate, bore fluid flow rate, air-gap and take-up speed. The membranes are named as S1 to S7 according to the different spinning conditions used.

TABLE 1

Spinning conditions of the various hollow membrane fibers

|  | S1 | S2 | S3 | S4 | S5 | S6 | S7 |
|---|---|---|---|---|---|---|---|
| Dope composition (wt %) | PVDF/EG/LiCl/NMP: 13/5/5/77 | | | | | | |
| Bore fluid (wt %) | NMP/water: 50/50 | | | | | | |
| Dope flow rate (ml/min) | 4.5 | 4.5 | 4.5 | 4.5 | 4.5 | 4.5 | 12 |
| Bore fluid flow rate (ml/min) | 1.5 | 1.5 | 1.5 | 1.5 | 3 | 1.5 | 6 |
| Bore fluid temperature (° C.) | 25 | 25 | 25 | 65 | 65 | 65 | 65 |
| Coagulation bath temperature (° C.) | 25 | 40 | 55 | 55 | 55 | 55 | 55 |
| Air gap (cm) | 3 | 3 | 3 | 3 | 3 | 3 | 3 |
| Take-up speed (m/min) | 3.5 | 3.5 | 3.5 | 3.5 | 3.5 | 7 | 14 |

Vacuum MD Desalination Experiment

The fabricated PVDF hollow fiber membranes were used in vacuum membrane distillation (VMD) experiments to evaluate the desalination performance. Before running the tests, a piece of membrane sample was assembled into a testing module with an effective fiber length of 15 cm. A 5-liter 3.5 wt % NaCl model solution was used as the feed. The feed solution temperature was controlled at 60° C. by a heater and circulated to the lumen side of the hollow fiber membrane. At the same time, the shell side of membrane was connected to a vacuum pump, and the pressure was maintained at about 20 mbar. The permeate sample was collected by a glass bottle that immersed in liquid nitrogen. The system was allowed to condition for half an hour, and then samples were taken every 10 minutes. The weight of the samples was measured by an accurate balance (A&D, GR-200), and their salinity was analysed by a conductivity meter Lab 960 m (SCHOOT instrument). For each module, at least 4 samples were collected and the average data was recorded. The VMD permeation flux ($J_w$) was calculated according the following equation:

$$J_W = \frac{m}{A \times t} \quad (1)$$

where m is the mass for the permeate sample collected over time t and A is the effective membrane calculated based on the membrane outer surface. During the VMD tests, no salt leakage was observed.

Membrane Characterisation

The hollow fiber membrane morphologies were observed by Field Emission Scanning Electron Microscopy (FESEM JEOL JSM-6700LV). The FESEM samples were prepared by fracturing the PVDF membranes in liquid nitrogen and coated with platinum using a JEOL JFC-1200 ion sputtering device. The average and bubble point pore sizes of hollow fiber membranes were measured by a CFP-1500 AE capillary flow porometer (PMI, Vista, Calif.). A PMI Galwick solution with a surface tension of 15.9 dynes/cm, was used to pre-wet the membrane samples for 1 day. Then, each wet sample was loaded into the porometer for measurements. Nitrogen was employed as the operating gas for the instrument. The membrane porosity ε was determined from Equation (2):

$$\varepsilon = \left(1 - \frac{m_m/V_m}{\rho_p}\right) \times 100\% \qquad (2)$$

where $m_m$ and $V_m$ are the mass and volume of one membrane sample, while $\rho_p$ is the density of the PVDF polymer. $m_m$ was measured by an accurate balance (A&D, GR-200), and $V_m$ was obtained from the dimension of the membrane sample. $\rho_p$ was measured with a density kit and Mettler Toledo balance according to the Archimedean principle. Firstly, a dry membrane sample was weighed in air. Then, it was weighed again while immersion in an analytic grade hexane solution. The density of the polymer material was calculated from the following equation:

$$\rho_p = \left(\frac{w_a}{w_a - w_h}\right) \times \rho_h \qquad (3)$$

where $w_a$ and $w_h$ are the membrane weights in air and hexane, respectively, and $\rho_h$ is the density of hexane. 10 measurements were conducted and the average density value was obtained to be 1.77 g/cm$^3$.

The mechanical properties of hollow fiber membranes in terms of maximum tensile strength, Young's modulus and maximum tensile strain were measured by an Instron tensiometer (Model 5542, Instron Corp.). The starting gauge length was 50 mm, and the elongation rate was 10 mm/min.

Figure 2:
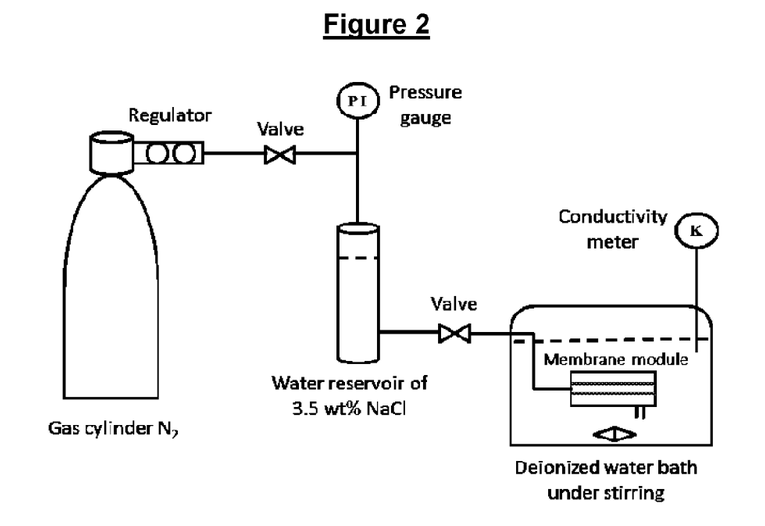
FIG. 2 shows a schematic representation of a laboratory-scale setup for LEP measurements.

The liquid entry pressure (LEP) of hollow fiber membranes was determined by a lab-made setup as show in FIG. 2. Before the measurements, model seawater (3.5 wt % NaCl) and membrane modules were firstly prepared. The former was stored in a 200 ml stainless steel cylinder with a pressure gauge on its top, while the latter was connected to the cylinder with its outlet (i.e., lumen side) sealed. During the test, the membrane module was immersed in a water bath. Compressed N$_2$ from a gas tank was introduced onto the model seawater so that the hydraulic pressure in the membrane lumen side increased with a step of 0.2 bar every 5 minutes. The conductivity of the water bath was continually monitored by a conductivity meter Lab 960 m (SCHOOT instrument). The LEP was determined when the water conductivity increased sharply because the seawater was pushed through the membrane at this pressure.

Figure 3:
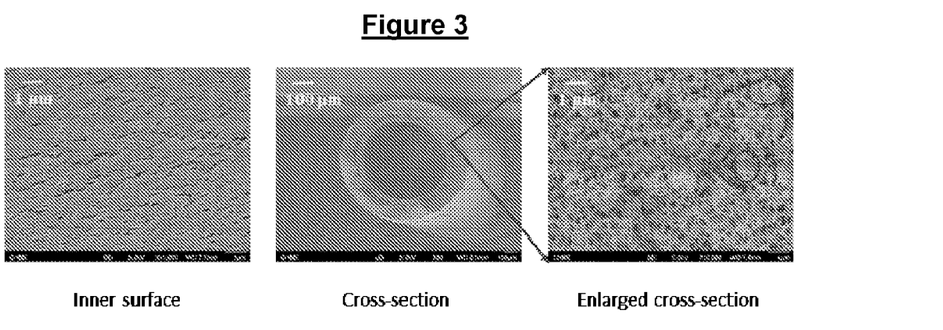
FIG. 3 shows the FESEM images of the surface and cross-section morphology of S1 fiber membrane.

FIG. 3 shows the cross-section morphology of S1 hollow fiber membrane. S1 hollow fiber membrane has been spun from a coagulation bath having a temperature of 25° C. As seen from FIG. 3, a porous inner surface is obtained. Since the inner surface is facing the feed solution during the VMD experiments, a porous surface is desirable for a better permeation flux. The vapour transport resistance is reduced during VMD operation and there is also provided a higher surface area for water to evaporate on the surface. This morphology is obtained because a relatively weak bore fluid of 50/50 weight/weight % NMP/water is used as the bore fluid, which causes a delayed phase inversion process.

The S1 hollow fiber membrane has a sandwich structure. The sandwich structure comprises two open cell sponge-like porous layers and a thin macrovoids middle layer. The open cell sponge-like structures enhance the mechanical strength of resultant hollow fiber membrane. At the same time, this structure helps to maintain a high membrane porosity and to ensure a good VMD flux. This structure is derived from spinodal liquid-liquid decomposition of PVDF dope composition. In the current case, two arrangements have been designed to facilitate liquid-liquid demixing. Firstly, a strong non-solvent water is used as the external coagulant which expedites the instantons liquid-liquid demixing. It is found that when water is used as coagulant, interconnected cellular type structure is formed. Conversely, when alcohol is added in the coagulation bath, spherulitic globule structure appears. This is because the water/alcohol mixture is a weaker non-solvent, which delays the demixing process and allows crystallization. Besides external coagulation, the EG and LiCl additives in the current polymer dope composition also promotes liquid-liquid demixing. Both additives are non-solvents, which reduces the thermodynamic miscibility of the dope composition. This enhances liquid-liquid phase separation during membrane formation. Therefore, through the manipulation of dope composition and external coagulant, the resultant hollow fiber membrane forms desirable open cell sponge-like structures.

Other than the sponge-like porous layer, the sandwich structure also comprises a thin macrovoid layer. This thin layer reduces the possible adverse effect of macrovoids on membrane mechanical strength, since the first target is to obtain PVDF fibers with superior mechanical stability. In the meantime, the existence of some macrovoids helps to increase membrane void fraction, which is beneficial to retain a reasonable VMD flux. The attainment of suppressed macrovoid formation is due to the polymer dope composition. In particular, the addition of LiCl has increased the viscosity of the dope composition. This increase is because of the interaction between Li$^+$ ions and electron rich groups in PVDF. The increased solution viscosity would delay the mutual diffusion between solvent and non-solvent. Thus, the phase inversion rate is retarded (kinetic effect) and therefore, macrovoid formation is suppressed. Accordingly, only a thin macrovoid layer is formed in the resultant hollow membrane fiber.

TABLE 2

Properties of the obtained hollow membrane fibers

|  | S1 | S2 | S3 |
| --- | --- | --- | --- |
| Coagulation temperature (° C.) | 25 | 40 | 55 |
| Pore size (nm) | 126 | 131 | 143 |
| Porosity (%) | 70 | 73 | 77 |
| LEP (bar) | 5.0 | 4.8 | 4.2 |
| Maximum tensile strength (MPa) | 3.2 | 3.6 | 3.8 |
| Young's modulus (MPa) | 48.8 | 63.5 | 84.3 |
| Maximum tensile strain (%) | 116 | 126 | 130 |

Table 2 tabulates the mechanical properties of S1 hollow fiber membranes. Because of the specially designed structure, these PVDF membranes exhibit good tensile strength of 3.2 MPa. This is larger than most of the PVDF hollow fibers membranes used in MD application, including those single bore, multi-bore and dual-layer hollow fibers. Meanwhile, the flexibility of the fibers is not sacrificed, as the tensile strain is larger than 110%. The much enhanced mechanical properties are owing to the interconnected sponge-like structures.

Table 2 also provides the pore size and porosity of the S1 hollow fiber membrane. A mean pore size of 126 nm and a large porosity of 70% is attained for the S1 hollow fiber membrane. Generally, membranes with a larger pore size and porosity have advantages of lower mass transfer resistance and thermal conductivity, which are favourable for higher MD permeation flux. Typically, pore sizes ranging from 100 to 600 nm are recommended for MD processes. However, for VMD, suitable membranes need to be designed with smaller pores to withstand the applied vacuum. Thus, the pore size of the S1 hollow fiber membrane is in the optimal range for VMD applications.

As shown in Table 2, the S1 hollow fiber membrane exhibits a LEP value of 5.0 bar. This high LEP value is not only attributed to the optimal membrane pore size, but also ascribed from the thick sponge-like structure. The latter has effectively increased the tortuosity of the membranes, which increases the wetting resistance. Since LEP represents the minimum transmembrane pressure for the water to permeating through, this high LEP value of the S1 hollow fiber membrane indicates a very low risk of membrane wetting during operation.

Further, the S1 fibers show a permeation flux of 14.2 kg/m$^2$·h at 60° C. This flux is not too low, which is owing to the open cell porous structure and the existence of some macrovoids in the membrane. However, the flux value may also not be high enough for practical VMD applications. Nonetheless, since the S1 hollow fiber membrane has superior mechanical strength and LEP, it could be further improved with a more porous structure to increase the flux. Therefore, various changes in the spinning conditions were made as follows.

Effects of Coagulation Bath Temperature

Figure 4:
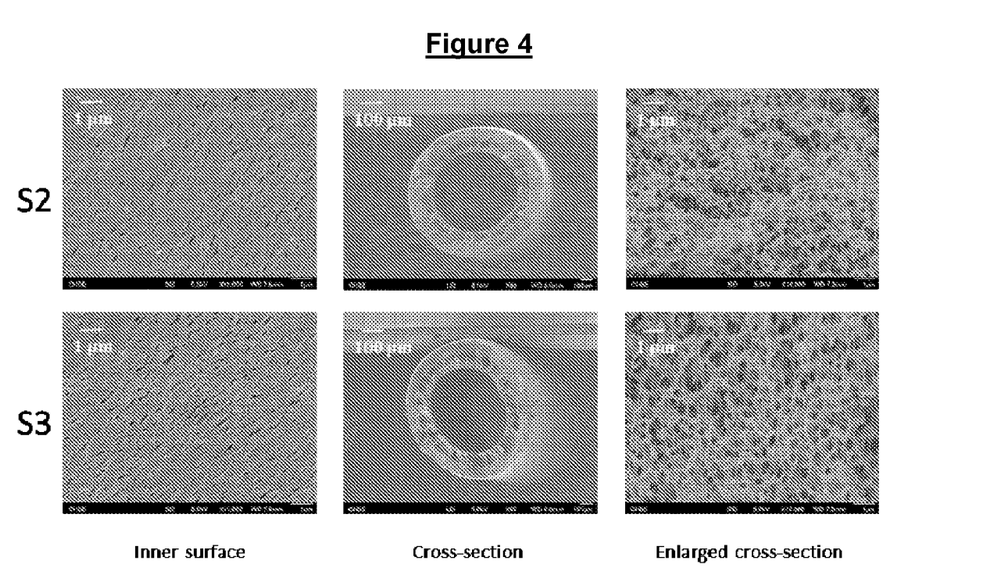
FIG. 4 shows the FESEM images of the surface and cross-section morphology of S2 and S3 fiber membranes.

The effects of elevated coagulation bath temperatures on resultant hollow fiber membrane morphology was investigated. FIG. 4 displays the FESEM images of S2 and S3 hollow fiber membranes prepared from a coagulant bath having a temperature of 40 and 55° C., respectively. It is seen that the inner surface structures are similar to those of S1 fiber membranes, where porous surfaces are obtained. This is because the formation of inner surface is mainly governed by bore fluid conditions. The change in coagulation bath temperature does not affect the inner surface morphology much.

On the other hand, two obvious changes in the cross-section morphologies have been noticed. Firstly, with a higher coagulation bath temperature, the layer of macrovoids becomes thicker. This is because the membrane formation is delayed at elevated temperature, especially for the inner part of cross-section. This delay provides enough time for the bore fluid to penetrate into the cross-section for polymer precipitation. Thus, inward pointing macrovoids are formed at the inner layer of cross-section. The higher the coagulation bath temperature, the longer the macrovoids are due to longer duration for the bore fluid to effect. Secondly, with a high coagulation bath temperature, the sponge-like structure becomes more porous with larger open cells. This results from liquid-liquid demixing rate change. A higher temperature causes a faster diffusion rate between solvent and non-solvent. Therefore, the tendency of liquid-liquid demixing becomes higher than that at a lower coagulation temperature. As discussed earlier, the faster liquid-liquid demixing would result in larger cellular structures. Therefore, these two changes are observed in the resultant hollow fiber membranes.

By changing the temperature from 25 to 55° C., the membrane morphology changes from symmetric spherical crystallite structures to asymmetric cellular structures. The former is because of crystallization dominated phase inversion, while the latter is ascribed from liquid-liquid demixing. In summary, a higher coagulation bath temperature leads to PVDF membranes with cellular structures and finger-like macrovoids, while a lower temperature results in sponge-like structures and/or possible crystallite particles.

The larger open cell structure and higher number of macrovoids are beneficial to increase membrane porosity and permeation flux. Table 2 compares the porosity and pore size values of membranes S1, S2 and S3. As expected, the porosity and pore size have an increasing trend from S1 to S3. It is worth noting that the change in pore size is rather small. This is because the skin layer that controls the average membrane pore size does not change much. This is helpful in retaining the wetting resistance of the hollow fiber membranes. Table 2 displays that the LEP values for the three membranes have a decreasing trend from S1 to S3. This is due to the change in the cross-section porosity and evolution of large macrovoids. Nevertheless, the LEP value of 4.2 bar for S3 membrane is still much higher than the typical operation pressure in VMD. The data indicates that these membranes are suitable for VMD applications.

Figure 5:
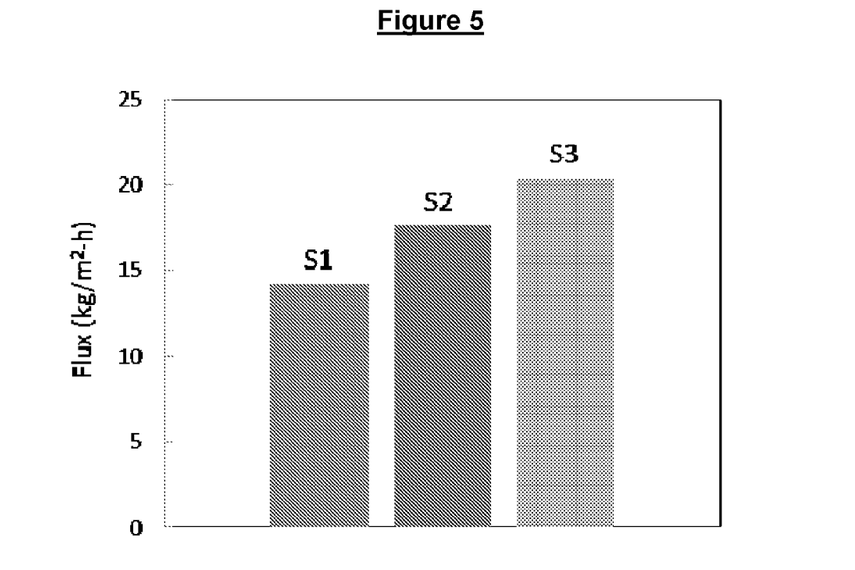
FIG. 5 shows the vacuum membrane distillation performance of hollow fiber membranes S1 to S3.

FIG. 5 presents the VMD desalination performance of membranes S1, S2 and S3. There is an increasing flux trend from S1 to S3, owing to the higher membrane porosity. Thus, it can be seen that a higher coagulation bath temperature results in a membrane with better permeation flux.

While it would be expected that the membrane mechanical properties might decrease from S1 to S3 due to larger porosity, it can be seen from Table 2 that the mechanical strength is not sacrificed, and in fact, it increases from S1 to S3. The tensile strength increases from 3.2 MPa in S1 to 3.8 MPa in S3. This is mainly attributed to the cellular structures formed at higher coagulation bath temperature. Although the S1 membrane has sponge-like structure, it can be seen from the cross-section morphology that there are some crystallite particles (highlighted in FIG. 3). Those particles may render a poorer tensile strength. On the contrary, the S3 membrane shows a full cellular structure. The net-like cellular structure has improved the overall membrane mechanical properties.

Effects of Bore Fluid Temperature

Figure 6:
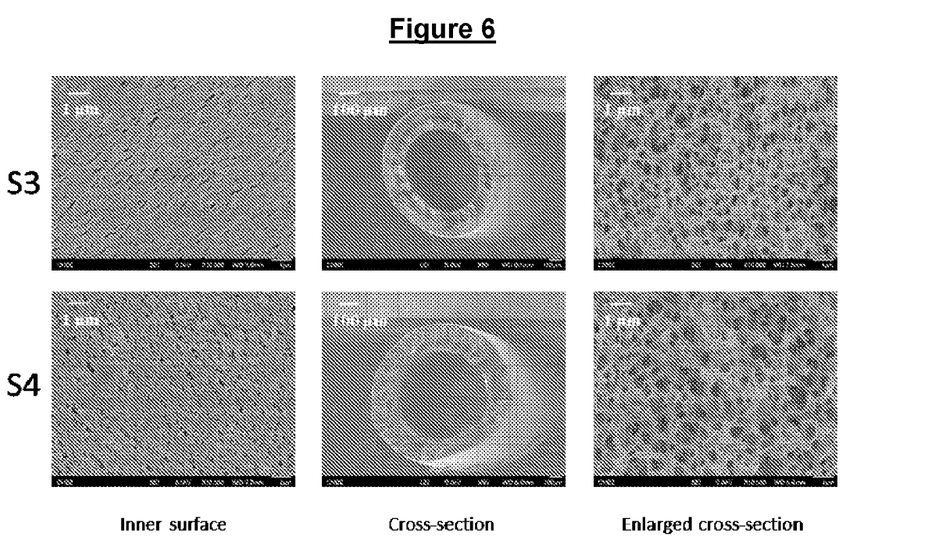
FIG. 6 shows the FESEM images of the surface and cross-section morphology of S3 and S4 fiber membranes.

With the coagulation bath temperature fixed at 55° C., the effects of bore fluid temperature was investigated. FIG. 6 compares the FESEM images of S3 and S4 hollow fiber membranes, which were prepared from bore fluid temperatures of 25 and 65° C., respectively. A more porous inner surface morphology is observed in S4. This is because the bore fluid becomes weaker at a higher temperature. A weaker bore fluid would produce a hollow fiber membrane with higher inner surface porosity. However, the weaker bore fluid causes an irregular inner surface geometry. This is because of the elasticity and buckling instability of the inner shell. Since there is a stronger outer coagulation, the phase inversion at the outer surface generates an inward radial force by the shrinkage of nascent fiber. This force will buckle the interface formed between the dope composition and bore fluid. As a result, an irregular inner surface geometry is developed.

FIG. 6 also shows that additional macrovoids are formed in S4 fiber membrane as compared to that in S3 fiber membrane. This is probably due to the increased dope composition temperature that reduces its polymer viscosity. In order to maintain a bore fluid temperature of 65° C. until it contacts the dope composition, the spinneret was also heated up to 65° C. The higher spinneret temperature inevitably increased the polymer dope temperature a bit. This resulted in a slightly decreased polymer viscosity. Consequently, when solidification took place in the coagulation bath, some macrovoids evolved due to the reduced polymer viscosity.

TABLE 3

Properties of spinning conditions and flux obtained

|  | S4 | S5 | S6 |
|---|---|---|---|
| Bore fluid flow rate (ml/min) | 1.5 | 3 | 1.5 |
| Take-up speed (m/min) | 3.5 | 3.5 | 7 |
| Flux at 60° C. (kg/m²h) | 25.1 | 33.5 | 27.6 |

Table 3 shows the VMD performance of the various membranes. Hollow fiber membrane S4 has an improved permeation flux of 25.1 kg/m²·h obtained at 60° C. as compared to S3. This is mainly attributed to the more porous inner surface at higher bore fluid temperature, as well as the additional macrovoids present. However, the irregular inner surface geometry is not advisable for practical VMD applications.

Figure 7:
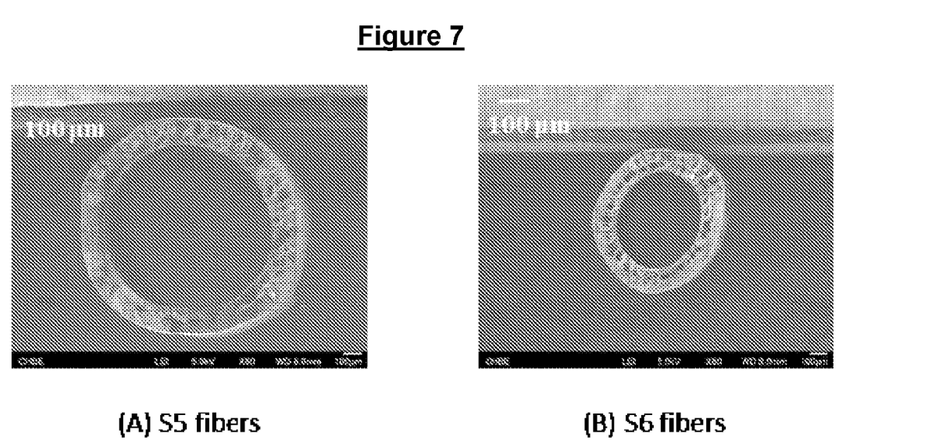
FIG. 7 shows the FESEM images of the cross-section morphology of S5 and S6 fiber membranes.

To solve the irregular geometry issue the bore fluid flow rate was increased and the take-up speed was increased. FIG. 7A displays the morphology of the S5 hollow fiber membrane that was prepared at a higher bore fluid flow rate of 3 ml/min as compared to the S4 membrane which was prepared using a bore fluid flow rate of 1.5 ml/min.

When the bore fluid flow rate was increased, the irregular inner surface geometry disappeared. The increased bore fluid flow rate exerts an expanding force to push the dope composition outward. This force balances the inward radial force from precipitation of outer dope. Thus, a circular fiber inner contour is maintained. Meanwhile, because of the expanding force, the fiber diameter becomes larger and wall thickness becomes smaller. As a result, a much enhanced VMD flux of 33.5 kg/m²h is achieved for membrane S5.

FIG. 7B exhibits the morphology of S6 hollow fiber membrane that was prepared from the same conditions as S4, except a higher take-up speed of 7 m/min was used as compared to a take-up speed of 3.5 m/min for S4. The irregular inner surface geometry disappeared at the higher take-up speed. This is because of two reasons. Firstly, the increased take-up speed caused a higher elongational stress. This drew down the fiber wall thickness and reduced the shrinkage of nascent fiber. Consequently, the inward radial force by fiber shrinkage was reduced. Then, the irregular inner contour was not formed. Secondly, FIG. 7B indicates that the S6 fiber inner diameter became smaller than that for S4 fibers. Since the inlet bore fluid flow rate was the same (i.e. 1.5 ml/min), a smaller inner diameter translated into a faster bore fluid flow inside the nascent fiber. Therefore, there was sufficient bore fluid liquid to withstand the inward compression force. Thus, the irregularity of inner contour was suppressed. Table 3 presents that S6 fibers show a slightly higher VMD permeation flux than S4 fibers. This is mainly owing to the draw-down in wall thickness that reduces the mass transfer resistance.

Therefore, an elevated bore fluid temperature results in a membrane with a more porous inner surface, and therefore a higher VMD flux. By increasing the bore fluid flow rate or take-up speed, the irregular inner surface geometry issue may be solved.

Utilisation of High Take-Up Speed

For commercial application of hollow fiber membranes, a high take-up speed is favourable to maximize the production rate and to minimize the fabrication cost. Therefore, the possibility of spinning the hollow fiber membranes at a higher take-up speed with the optimum conditions obtained above was tested. The coagulation bath temperature was set at 55° C., and the bore fluid temperature was controlled at 65° C. A relatively high take-up speed of 14 m/min was utilized.

Figure 8:
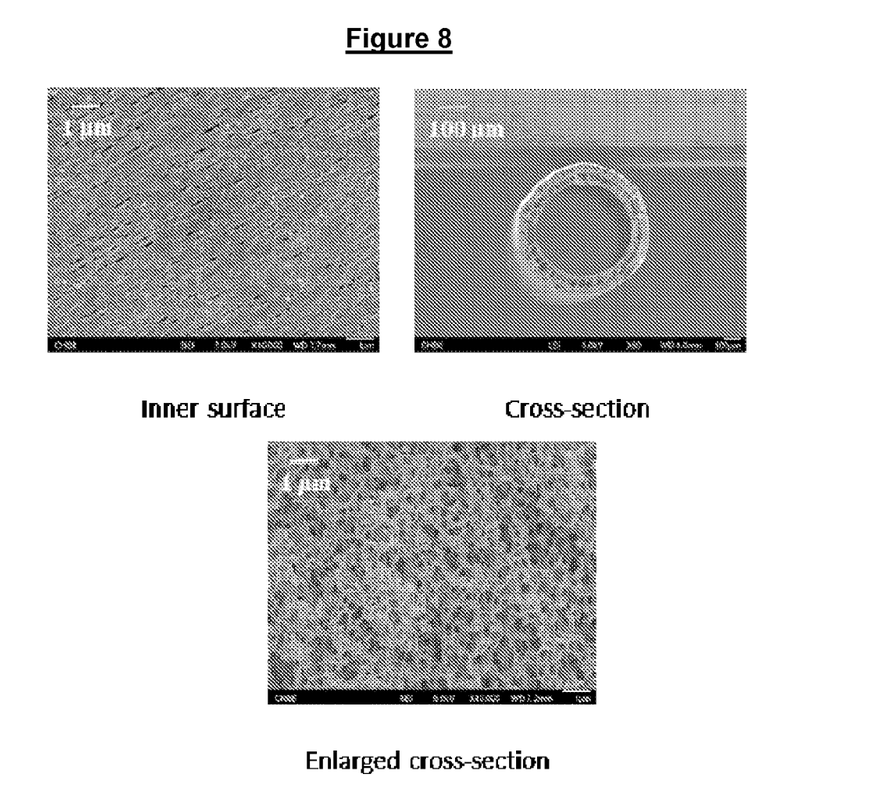
FIG. 8 shows the FESEM images of the surface and cross-section morphology of S7 fiber membrane.

FIG. 8 exhibits the resultant S7 fiber morphologies. A circular inner surface geometry was obtained. A small wall thickness of 110 μm was realized through the manipulation of dope composition and bore fluid flow rate. In addition to the cellular membrane morphologies, this reduced wall thickness is also advantageous in achieving a good membrane performance. A much enhanced VMD permeation flux of 37.8 kg/m²h at 60° C. feed was obtained. It may be of concern that the small thickness of the wall would sacrifice the membrane wetting resistance. The LEP of the fibers was therefore tested, and a value of 4.0 bar was attained. The LEP value was largely retained owing to the denser inner surface formed at higher take-up speed as shown in FIG. 8.

However, the reduced wall thickness may lead to an inferior membrane mechanical strength. Therefore, the fiber outer to inner diameter ratio has to be controlled. A higher outer to inner diameter ratio will result in a higher mechanical strength. Accordingly, a ratio of 1.4 was attained. The maximum tensile strength of the S7 hollow membrane fiber is 5.2 Mpa, the Young's modulus is 111.8 MPa and the maximum tensile strain is 140%. Therefore, it can be seen that this outer to inner diameter ratio was sufficient to provide enough mechanical strength to the fiber membranes.

From the above, it can be seen that the hollow membrane fibers of the present invention are not only superior in mechanical strength and LEP values, but also have good VMD permeation flux. Further, high-speed spinning may be carried out and the resultant fiber membranes obtained have a tensile strength of 5.2 MPa, LEP of 4.0 bar and a VMD flux of 37.8 kg/m²h at 60° C. feed.

Whilst the foregoing description has described exemplary embodiments, it will be understood by those skilled in the technology concerned that many variations may be made without departing from the present invention. Further, the exemplary embodiments are only examples, and are not intended to limit the scope, applicability, operation or configuration of the invention in any way.

The invention claimed is:

1. A hollow fiber membrane for vacuum membrane distillation, the hollow fiber membrane having a maximum tensile strength of ≥3.5 MPa and a liquid entry pressure (LEP) of ≥3.0 bar, wherein the hollow fiber membrane is a single layer hollow fiber membrane comprising a wall with a thickness of ≤150 μm and a cross-section comprising two open cell layers with an array of interconnected pores and a macrovoid layer between the two open cell layers, wherein the hollow fiber membrane is prepared from a dope composition comprising a hydrophobic polymer, an additive and a solvent, the additive comprising a Li⁺-containing additive.

2. The hollow fiber membrane according to claim 1, wherein the hollow fiber membrane comprises an outer surface on its outer side and an inner surface on its inner side and facing its lumen, wherein the hollow fiber membrane has a continuous skin on its inner surface and on its outer surface, wherein pores are formed in the skin of the inner surface and in the skin of the outer surface.

3. The hollow fiber membrane according to claim 1, wherein the hollow fiber membrane has a porosity of ≥60%.

4. The hollow fiber membrane according to claim 1, wherein the hollow fiber membrane is hydrophobic.

5. The hollow fiber membrane according to claim 1, wherein the weight ratio of the hydrophobic polymer to the additive to the solvent is 12-16%:8-15%:69-80%.

6. The hollow fiber membrane according to claim 1, wherein the hydrophobic polymer is polyvinylidene fluoride (PVDF).

7. The hollow fiber membrane according to claim 1, wherein the additive is a non-solvent.

8. The hollow fiber membrane according to claim 7, wherein the non-solvent is selected from the group consisting of: ethylene glycol, polyethylene glycol, propanol, glycerol, water, lithium perchlorate, lithium chloride, and a combination thereof.

9. The hollow fiber membrane according to claim 1, wherein the solvent is selected from the group consisting of: N-methyl-2-pyrrolidone (NMP), dimethylacetamide (DMAC), dimethylformamide (DMF), dimethylsulfoxide (DMSO) and a combination thereof.

10. The hollow fiber membrane according to claim 1, wherein the thickness of the macrovoid layer is 1-60 μm.

11. The hollow fiber membrane according to claim 1, wherein the hollow fiber membrane has a substantially circular cross-section.

12. The hollow fiber membrane according to claim 1, wherein the hollow fiber membrane has a vacuum permeation flux of 8 kg/m$^2$ h at 60° C. seawater feed.

13. The hollow fiber membrane according to claim 1, wherein the additive comprises at least two additives, and wherein one of the at least two additives is the Li$^+$-containing additive.

14. The hollow fiber membrane according to claim 1, wherein the additive comprises lithium chloride and ethylene glycol.

* * * * *